United States Patent [19]

Li

[11] 4,317,600
[45] Mar. 2, 1982

[54] SELF-LUBRICATED, HIGH-TEMPERATURE BEARING

[76] Inventor: Chou H. Li, 379 Elm Dr., Roslyn, N.Y. 11576

[21] Appl. No.: 69,350

[22] Filed: Aug. 24, 1979

[51] Int. Cl.³ ............... F16C 33/32; F16C 33/34; F16C 33/66
[52] U.S. Cl. .................. 308/188; 308/202; 308/241; 308/DIG. 9
[58] Field of Search .......... 308/188, 187, 202, 241, 308/DIG. 8, DIG. 9

[56] References Cited

U.S. PATENT DOCUMENTS

| | | | |
|---|---|---|---|
| 3,052,954 | 9/1962 | Strong | 308/241 |
| 3,104,917 | 9/1963 | Schwartzwalder | 308/DIG. 8 |
| 3,360,312 | 12/1967 | De Wit et al. | 308/187 |
| 3,466,243 | 9/1969 | Buckley et al. | 308/241 |
| 3,491,423 | 1/1970 | Haller | 308/188 |
| 3,517,974 | 6/1970 | Eklund | 308/187 |

FOREIGN PATENT DOCUMENTS 524934  11/1976  U.S.S.R. ............. 308/DIG. 8

*Primary Examiner*—Richard R. Stearns

[57] ABSTRACT

A new type of self-lubricated bearing ball or roll has a microstructure. This microstructure consists of uniformly shaped and equal-sized elongated grains all aligned normally of the bearing surface, to achieve uniform chemical composition and physical and chemical properties at all points on, and also at a specific distance normally into, the bearing surface. The grain boundaries are filled with a lubricating eutectic compound which is self-replenishing to the bearing surface at precisely when and where needed.

11 Claims, 2 Drawing Figures

SELF-LUBRICATED, HIGH-TEMPERATURE BEARING

BACKGROUND

1. Field:

This invention relates to bearings, and more particularly relates to bearing balls or rolls having controlled microstructures.

2. Prior Art:

Existing bearings are deficient, being non-uniform and non-symmetrical in chemical composition, microstructure, and physical and chemical properties. As a result, they wear or deform non-uniformly and uncontrollably, even from the very beginning of their services. In addition, they depend on external lubricants whose supply is also non-uniform and unpredictable.

Take, for example, the existing bearing ball. It is generally made by cutting from a long drawn or rolled rod a short piece that is roughly formed into a sphere by die-forging. The rough sphere is then ground into a sphere according to specific tolerances and heat-treated to achieve the required surface hardness. But the rod initially has a fibrous microstructure and is, therefore, anisotropic in its physical and chemical properties. Specifically, the rod is physically stronger and hence deforms less under load in the longitudinal direction (i.e., along the fibrous grains). On the other hand, chemical and corrosive agents tend to attack the ends of the rod and to penetrate preferentially along the fibrous grain boundaries; i.e., longitudinal attack is more rapid.

The fibrous nature of the original rod is distorted by the forming operation, which, in addition, introduces a distinct weakness in a meridian plane of the sphere. Heat treatment cannot homogenize the microstructure; in fact, nothing short of a melting and resolidification can remove the fibrous structure.

Rolled, drawn, or improperly grown materials have preferred orientations. The anisotropy in these materials causes wide variations in the physical properties, such as Young's modulus. In alpha-iron, for example, the observed maximum Young's modulus is $41.2 \times 10^6$ psi, while the minimum is only $19.2 \times 10^6$ psi, compared to $30.0 \times 10^6$ psi for the average polycrystalline material. Under a loading stress of 200,000 psi, for example, a half-inch steel ball deforms elastically as little as about 2.4 mils but as much as 5.2 mils, a difference of 2.8 mils. The inner and outer races of a ball bearing consisting of ten half-inch steel balls and operating at 2,000 rpm are therefore each subjected to cyclic loadings at 333 cycles per second, with a maximum strain amplitude of 2.8 mils. Thus, the inner race, being under greater Hertzian stresses than the outer, often fails prematurely from fatigue. Hence, improving the mechanical and chemical isotropy of the bearing balls should be very effective in achieving bearing reliability. On the other hand, improving the initial dimensional sphericity (e.g., from 50 to 20 microinches at great cost) of an anisotropic half-inch ball elastically deformed up to 5.2 mils is relatively ineffective. In actual practice, even larger plastic deformations are also possible.

Other ball making methods, such as welding two hemispheres, give different but also anisotropic spheres. It is easy to see that an anisotropic sphere corrodes and distorts unevenly so that even a perfect sphere becomes, shortly after being put into service, a nonsphere.

In the case of cylindrical bearing made from a rod, the fibers are oriented parallel to the cylindrical axis, making the bearing weak to withstand load and to distort significantly and often non-uniformly, even on the first service.

Accordingly, an object of the invention is to provide improved ball or roller bearings;

A further object of this invention is to provide bearings which distort, wear, and corrode uniformly;

A broad object of the invention is to provide bearings which have reliable and long lives, even at high temperatures;

Another broad object of the invention is to provide ball or roller bearings having, respectively, center or axial symmetrical microstructures;

Another object of the invention is to provide bearings having self-lubricating properties with self-replenishing lubricants;

A still further object of the invention is to provide bearings with built-in lubricants at the grain boundaries to supply the bearing surface at precisely when, where, and to the amount needed.

Yet another object of the invention is to provide bearings with unique surface layers to better withstand fatigue and stresses or strains.

SUMMARY

To these ends, the present invention provides a bearing element which has a microstructure consisting of uniformly shaped and equal-sized grains all aligned normally of the bearing surface to better withstand the service loads. This microstructure not only is center or axial symmetrical, respectively for the ball or roller bearing, but has symmetrical chemical composition and physical or chemical properties. The grain boundaries consist of a high-temperature, eutectic lubricating compound which comes out onto the bearing surface precisely when, where, and to the amount needed.

BRIEF DESCRIPTION

The invention and its further objects and features will be more clearly understood from the following detailed description taken in conjunction with the drawing in which:

FIG. 1 shows the surface of an improved bearing ball, or part of the surface of an improved bearing roller; and FIG. 2 is a cross-section of the bearing of FIG. 1, taken along the line 2—2.

DETAILED DESCRIPTION

It will be understood that the specific embodiments described are merely illustrative of the general principles of the invention and that various modifications are feasible without departing from the spirit and scope of the invention. That is, the invention is of general applicability for increasing the performance, reliabililty, and life of the improved bearings. It is also evident that materials other than those specifically mentioned obviously may be used instead.

The improved bearing ball 10 (FIGS. 1 and 2) is made from a free molten metal drop, which freezes while suspended in a fluid (e.g., air, or water) medium without having any of its surface contacting a solid. This condition achieves dimensional sphericity through surface tension effects. A drop tower or RF levitation field is used to achieve the spherical shape and, in particular, controlled cooling and crystal nucleation or growth from the spherical surface 18 raidally inward. The growth nuclei 11 tend to be equally spaced in a close-packed design. To more positively control the nucleation, the spherical surface is evaporated with a pattern of a nucleating substance e.g., highly thermally emisive oxide, or water-cooled tips 12 are provided at predetermined points near the spherical surface.

Figure 1:
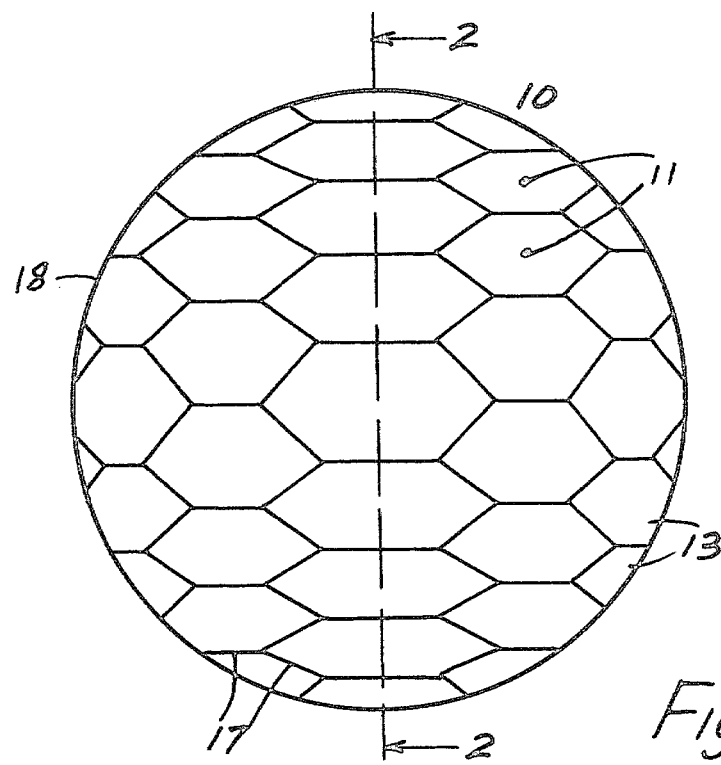
Figure 2:
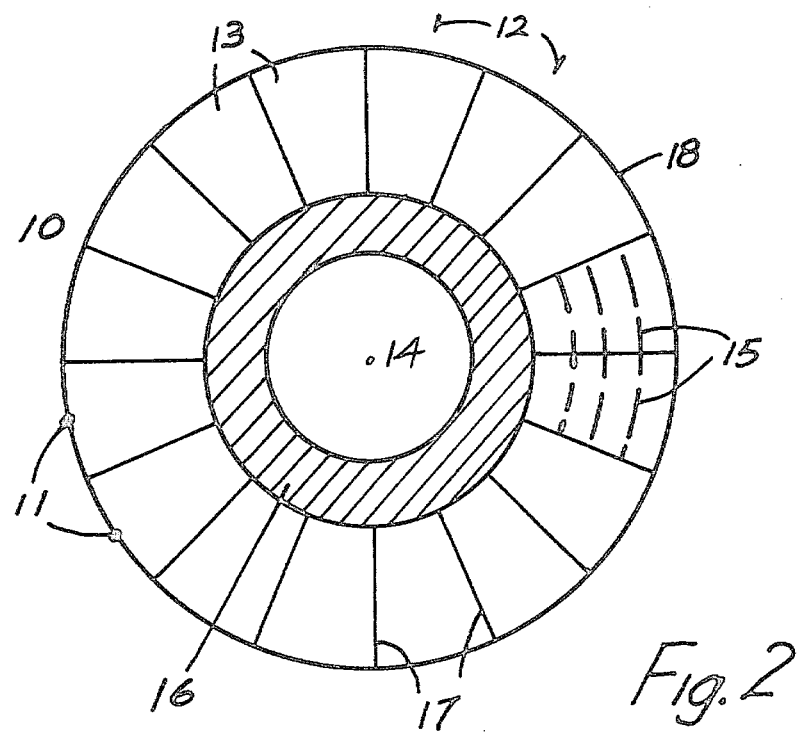

A spherical cellular growth-pattern may be adopted so that equal-sized hexagonal, and elongated but tapering cells 13 will form and grow toward the center 14 of the sphere, as shown in FIGS. 1 and 2. The cells may break down into grains 15, as shown by the dotted lines in some cells of FIG. 2. In both cases, one achieves spherical symmetry not only dimensionally, but also microstructurally, physically, and chemically. The ball will thus retain its spherical shape most consistently under varied service conditions including corrosive ambients, extreme loading conditions, and high-temperature surface evaporations. Such a ball will remain perfectly spherical under all service conditions; there is no reason why one direction, spot, or region should be more deformed, corroded, or evaporative than any other direction, spot, or region.

To further improve the performance of this bearing ball, a cellular (or granular) boundary lubrication principle is used. The ball, for example, can be made of (nickel or) iron with up to 10 percent by weight of aluminum, arsenic, gold, beryllium, columbium, cobolt, chromium, copper, germanium, manganese, molybdenum, nickel, phosphorous, sulfur, antimony, silicon, tin, tantanium, titanium, vanadium, tungsten, and zirconium, so that the core 16 of the sphere and the cellular boundaries 17 are filled with lubricating, low-melting eutectic compounds. These compounds are continuously replenishable from inner portions of the same sphere. These inner portions are shown to be hollow because of shrinkage void or liberated gases during solidification. It is even desirable in some cases to deliberately increase the solution of such gases as nitrogen, helium, argon, carbon monooxide, . . . in the molten bearing alloy (e.g., steel) to enlarge the central void, which reduces the bearing weight without destroying its static or dynamic balance qualities.

Note that the eutectic lubricating material is segregated from the melt at the grain boundaries during the formation of the grains and has a melting temperature lower than that of the grain material so that upon loading of the bearing during its rotation, the local hot spots melt the eutectic lubricating material without melting the grain material. The melted eutectic lubricating material is thus supplied by centrifugal force onto the bearing surface where and when it is locally hot. Also, the bearing has a reservoir of the same lubricating material located at substantially equal distances from the bearing surface and communicative through the grain boundaries to the bearing surface thereby achieving self-replenishing properties.

Note that this bearing ball or sphere is self-lubricated by the built-in, high-temperature lubricants supplied at precisely where and when needed, and in the required amounts. Thus, while the ball runs cooler when compared to the conventional ball, even when it gets hot under extreme loading conditions, the built-in lubricants will come out to lower the drag and to prevent seizure or catastrophic failures.

For very high-temperature operations, molybdenum or tungsten containing sulfur is used as the bearing material. The eutectic sulfides of these refractory metals are still the best high-temperature lubricants available. Molybdenum is often preferable to tungsten from the weight viewpoint.

Bearing rollers having a transverse cross-section also representable by FIG. 2 can be made by melting the bearing alloy (e.g., steel) in a alumina or other refractory tube and simultaneously initiating solidification from the entire cylindrical surface 18 inward toward the cylindrical axis.

Diffusion coatings, such as carbides, chromides, or nitrides on steel, as well as peening or ball milling, introduce surface hardness and compressive residual stresses that enhance the fatigue strength and load-carrying ability of these balls or rollers. Laser glazing forms an extra-fine grain layer of uniform thickness on the bearing surface. These treatments, are, therefore, often desirable.

The invention is not to be construed as limited to the particular forms disclosed herein, since these are to be regarded as illustrative rather than restrictive.

I claim:

1. A bearing element having a bearing surface which defines a center and having a microstructure consisting of substantially uniformly shaped and equal-sized, elongated grains all aligned normally of the bearing surface to enhance the load-withstanding capacity, said microstructure having substantially symmetrical chemical composition and physical and chemical properties relative to the center of the bearing surface.

2. A bearing element as in claim 1 wherein the grains are close-packed, hexagonal cells.

3. A bearing element as in claim 1 which is in the form of a sphere and wherein said elongated grains are substantially symmetrical relative to the center of the sphere and all tapering in width or thickness toward the center.

4. A bearing element as in claim 1 which is in the form of a roller and wherein said grains are substantially symmetrical relative to the cylindrical axis.

5. A bearing element as in claim 1 which is made by solidifying a melt and wherein the grain boundaries comprise a eutectic lubricating material segregated from the melt during the formation of the grains and having a melting temperature lower than that of the grain material so that upon loading of the bearing element during its rotation, the local hot spots melt eutectic lubricating material without melting the grain material, said melted eutectic lubricating material being thus supplied by centrifugal forces onto the surface of the bearing where hot spots occur.

6. A bearing element as in claim 1 wherein the material of the grains consists of an iron alloy containing up to ten weight percent of a chemical element selected from the group consisting of Al, As, Au, Be, Cb, Co, Cr, Cu, Ge, Mn, Mo, Ni, P, S, Sb, Si, Sn, Ta, Ti, V, W, and Zr.

7. A bearing element as in claim 1 wherein the material of the grains consists essentially of a metal selected from the group consisting of molybdenum and tungsten, and the grain boundaries comprise sulfide of this metal.

8. A bearing element as in claim 1 wherein the grain boundaries comprise a lubricating material which centrifuges out onto the bearing surface where and when the surface is locally hot and including a reservoir of the same lubricating material loacted at substantially equal distances from the bearing surface and communicative through the grain boundaries to the bearing surface thereby achieving self-replenishing properties.

9. A bearing element as in claim 1 wherein the surface of the bearing element is hardened and grain-refined relative to the core portion of the bearing element.

10. The bearing element as in claim 1 wherein the bearing surface is hardened by laser glazing.

11. The bearing element as in claim 1 wherein the bearing surface is grain-refined by laser glazing.

* * * * *